United States Patent
Busch et al.

(10) Patent No.: US 9,828,174 B2
(45) Date of Patent: Nov. 28, 2017

(54) METHOD AND SYSTEM FOR MONITORING THE INTEGRITY OF FREIGHT CONTAINERS

(75) Inventors: Wolfgang Busch, Achim (DE); Klaus Hornbostel, Bremen (DE)

(73) Assignee: Airbus Defence and Space GmbH, Taufkirhchen (DE)

( * ) Notice: Subject to any disclaimer, the term of this patent is extended or adjusted under 35 U.S.C. 154(b) by 735 days.

(21) Appl. No.: 14/123,425

(22) PCT Filed: May 15, 2012

(86) PCT No.: PCT/EP2012/002072
§ 371 (c)(1),
(2), (4) Date: Sep. 29, 2014

(87) PCT Pub. No.: WO2012/167864
PCT Pub. Date: Dec. 13, 2012

(65) Prior Publication Data
US 2015/0039267 A1 Feb. 5, 2015

(30) Foreign Application Priority Data
Jun. 7, 2011 (DE) .......................... 10 2011 106 202

(51) Int. Cl.
*G07C 5/00* (2006.01)
*G07C 5/08* (2006.01)
(Continued)

(52) U.S. Cl.
CPC .......... *B65D 90/48* (2013.01); *G06Q 10/0833* (2013.01); *G07C 5/008* (2013.01);
(Continued)

(58) Field of Classification Search
CPC .......... G07C 5/008; G07C 5/08; G07C 5/085; G06Q 10/0833; G08B 25/10; B65D 90/48
(Continued)

(56) References Cited

U.S. PATENT DOCUMENTS

| 4,750,197 A | 6/1988 | Denekamp |
| 6,919,803 B2 * | 7/2005 | Breed .................. G06Q 20/203 340/426.19 |

(Continued)

FOREIGN PATENT DOCUMENTS

| DE | 10 2009 013 104 A1 | 9/2010 |
| EP | 2226767 A1 | 9/2010 |

OTHER PUBLICATIONS

State Intellectual Property Office of the People'S Republic of China, Notification of the First Office Action on a related application, May 6, 2015.

(Continued)

*Primary Examiner* — Bryan Bui
(74) *Attorney, Agent, or Firm* — Laurence P. Colton; Smith Tempel Blaha LLC

(57) ABSTRACT

A method for monitoring the integrity of a freight container along a transport route, the container having a sensor monitoring the container integrity, wherein the sensing of an event violating the container integrity is followed by event data representing the integrity violation being transmitted to an analysis center, wherein the event data is rated using predetermined criteria in respect of either a sanctioned or an unsanctioned integrity violation, and wherein opening or closing of the container is rated as a sanctioned integrity violation if an electronic authorization code representing the sanction is sent to the analysis center for the event data representing this integrity violation. Different types of opening and/or closing operations are distinguished by using authorization codes from different function groups, and the analysis center uses the type of function code to determine what type of opening operation and/or closing operation has taken, or is meant to take, place.

13 Claims, 1 Drawing Sheet

(51) Int. Cl.
   *G06Q 10/08*      (2012.01)
   *G08B 25/10*      (2006.01)
   *B65D 90/48*      (2006.01)
(52) U.S. Cl.
   CPC ............... *G07C 5/08* (2013.01); *G07C 5/085* (2013.01); *G08B 25/10* (2013.01)
(58) Field of Classification Search
   USPC ........................................................ 702/182
   See application file for complete search history.

(56) References Cited

U.S. PATENT DOCUMENTS

| | | |
|---|---|---|
| 2004/0041705 A1 | 3/2004 | Auerbach |
| 2006/0164235 A1 | 7/2006 | Gounder |
| 2008/0297346 A1 | 12/2008 | Brackmann |
| 2010/0253519 A1 | 10/2010 | Brackmann |
| 2011/0018707 A1 | 1/2011 | Dobson |

OTHER PUBLICATIONS

Deutsches Patent-Und Markenamt (German Patent and Trademark Office), Patent Search on priority German patent application No. 10 2011 106 202.9 (dated Nov. 28, 2011).
WIPO, International Search Report on priority International patent application No. PCT/EP2012/002072 (dated Jul. 19, 2012).

* cited by examiner

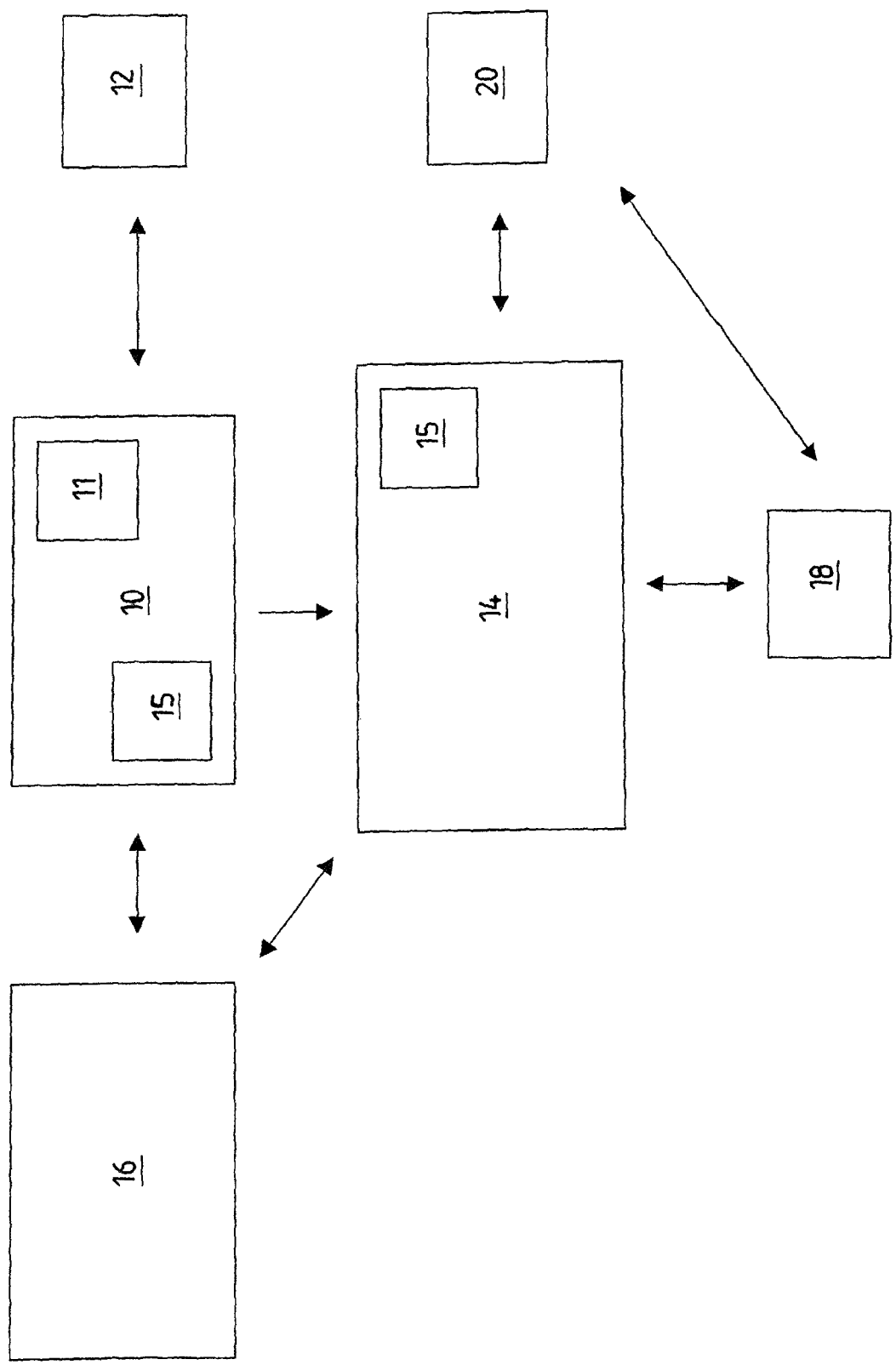

METHOD AND SYSTEM FOR MONITORING THE INTEGRITY OF FREIGHT CONTAINERS

BACKGROUND OF THE INVENTION

Technical Field

The present invention relates to a method and a system for monitoring one or more freight containers along a transport route, wherein at least one freight container has a monitoring device associated therewith that has at least one monitoring sensor monitoring the integrity of the freight container, wherein the sensing of an event violating the freight container integrity by the monitoring sensor is followed by event data, representing the integrity violation, being transmitted to a remote analysis center wherein the analysis center rates the transmitted event data using predetermined criteria in respect of either a sanctioned (authorized) or an unsanctioned (unauthorized) integrity violation of the freight container, and wherein opening or closing of the freight container is rated as a sanctioned or authorized integrity violation if an electronic authorization code representing the sanction for the opening operation or the closing operation is sent to the analysis center for the event data representing this integrity violation.

Prior Art

Such a method for monitoring freight containers is disclosed in WO 2010/099872 A1. The background of such a monitoring method and such a monitoring system is the fact that, nationally and internationally, the demands on the security of freight containers or of transport containers in shipping are increasing to an ever greater extent. The danger that individual freight containers will be opened on the transport route, after a loading operation by authorized personnel, by terrorists and provided with explosives or the like that are meant to be detonated at the destination of the freight container is categorized as particularly great.

BRIEF SUMMARY OF THE INVENTION

The method and system mentioned at the outset allow the integrity of freight containers to be tracked as completely as possible from the loading of said containers through the transport route therefor to the destination.

It is an object of the present invention to develop such a method and such a system further.

This object is achieved by a method for monitoring the integrity of one or more freight containers along a transport route, wherein at least one freight container has a monitoring device associated therewith that has at least one monitoring sensor monitoring the integrity of the freight container, wherein the sensing of an event violating the freight container integrity by the monitoring sensor is followed by event data, representing the integrity violation, being transmitted to a remote analysis center, particularly an analysis device associated with the analysis center, wherein the analysis center, particularly the analysis device associated therewith, rates the transmitted event data using predetermined criteria in respect of either a sanctioned (authorized) or an unsanctioned (unauthorized) integrity violation of the freight container, and wherein opening or closing of the freight container is rated as a sanctioned or authorized integrity violation if an electronic authorization code representing the sanction for the opening operation or the closing operation is sent to the analysis center for the event data representing this integrity violation, characterized in that different types of opening operations and/or different types of closing operations are distinguished by using respective authorization codes from different function groups (function codes), as result of which the analysis center can use the type of respectively received function code to determine what type of opening operation and/or what type of closing operation has taken place or is meant to take place. This object also is achieved by a system for monitoring the integrity of one or more freight containers along a transport route, particularly for carrying out the method as described above, wherein at least one freight container has a monitoring device associated therewith that has at least one monitoring sensor monitoring the integrity of the freight container, wherein the sensing of an event violating the freight container integrity by the monitoring sensor is followed by event data, representing the integrity violation, being able to be transmitted to a remote analysis center, particularly an analysis device associated with the analysis center, wherein the analysis center, particularly using an associated analysis device, can rate the transmitted event data using predetermined criteria in respect of either a sanctioned (authorized) or an unsanctioned (unauthorized) integrity violation of the freight container, and wherein opening or closing of the freight container can be rated as a sanctioned or authorized integrity violation if an electronic authorization code representing the sanction for the opening operation or the closing operation is available to the analysis center for the event data representing this integrity violation, characterized in that different types of opening operations and/or different types of closing operations can be distinguished by using respective authorization codes from different function groups (function codes), as result of which the analysis center can use the type of respectively received function code to determine what type of opening operation and/or what type of closing operation has taken place or is meant to take place.

According to the invention, individual opening operations are distinguished and/or individual closing operations are distinguished by using respective authorization codes from different function groups, subsequently also called function codes, as a result of which the remote analysis center can use the type or the function group affiliation of the respective received function code to determine what opening operation or what type of opening operation and/or closing operation has taken place or is meant to take place.

The use of different types of function codes for the authorization of an opening and/or closing operation for a freight container allows the analysis center to easily and effectively determine the status of the respective freight container to be monitored. If, for example at the beginning of transport, a freight container is meant to be closed with authorization for the first time by personnel who are sanctioned to do so, the sanctioned person in situ, that is to say the person who initially wishes to physically close the freight container, would use a suitable electronic authorization code or function code that is designed specifically for such first-time closing.

If the sanctioned person in situ accordingly wishes to authorize such first-time closing of the freight container, he sends a specific function code of the "first-time closing" type to the analysis center in connection with the physical closing operation for the freight container, usually the closing of a relevant freight container door.

When the authorization code or the function code is received, the analysis center can then firstly check it to determine whether it is suitable for the authorization. In other words, the authenticity, etc., thereof, inter alia, is checked.

Secondly, however, the invention provides for the analysis center to be able to detect just from the type of the function code that the closing operation for the freight container is precisely the first-time closing of the freight container that has been described, that is to say is closing of said freight container at the beginning of the transport. A suitable status manager in the analysis center can then be used to input or set the status "closed for the first time" for the relevant freight container.

In a further form of the invention, provision may be made for interim opening of the freight container prior to the conclusion of the transport, that is to say usually before the freight container has reached its destination, to be authorized with a different type of function code than subsequent opening, for example in particular final opening at the destination. In addition, it is conceivable for the type of function code also to be used to distinguish individual instances of interim opening from one another, for example to delimit first interim opening from subsequent further, second interim opening, etc.

Using the respective transmitted function code, the analysis center can generally detect the status of the freight container and, if need be, update a or the status manager accordingly.

Using the different types of function code, it is usually indirectly possible also to derive location information about the respective site of the freight container at the time at which the respective opening or closing operation is authorized. This is because, assuming due dispatch and due transport of the respective freight container, authorization with the function code of the type "first-time closing" will usually take place at the loading or starting location of the freight container, for example. When this function code is received in the analysis center, it can therefore be inferred that the freight container is situated at the starting location. Authorization with the function code of the type "final opening" will usually take place at the destination of the freight container. Authorizations of the type "interim openings", in turn, are performed at previously stipulated locations along the transport route of the freight container. Overall, under the cited conditions, it is therefore not absolutely necessary to locate the respective freight container directly using GPS, etc.

Expediently, the function codes of the same type or from the same function group have a shared identification that the analysis center can use to distinguish the function codes of different function code types in respect of the function group affiliation thereof. Such identification may be of diverse type, for example particular numerals or letters or combinations thereof within the electronic authorization or function codes.

In a further form of the invention, the analysis center does not continue to evaluate transmitted event data from a first sensor or from a first group of sensors of the monitoring device after it has received a function code for authorized interim opening of the transport container and also the event data associated with the interim opening operation for the freight container. Event data from at least one second sensor or from at least one second group of sensors of the monitoring device do continue to be evaluated, however.

By way of example, the analysis center can first of all stop the rating or monitoring of event data transmitted to it from a door sensor that monitors the state, closed or open, of the door of the freight container after the authorized interim opening, i.e. after the relevant function code and the associated sensor data have been received. The event data transmitted by a sensor for measuring the temperature inside the freight container, for example, can also be evaluated or analyzed during interim opening, however.

Thus, in one exemplary embodiment, the analysis center can ignore repeated opening or closing of the freight container door, for example, after authorized interim opening (and before further authorized closing), or the relevant door sensor signals arriving in the analysis center do not continue to be rated, which means that no alarm condition would be initiated. Hence, inspection, loading and/or unloading operations can be performed conveniently after the authorized interim opening.

By contrast, the signals from a temperature sensor, for example, inside the freight container can continue to be evaluated.

Such a scenario is particularly relevant to the monitoring of freight containers with a cooling device. In this way, even following authorized interim opening of such a cooling freight container, having temperature-critical foodstuffs or the like, for example, the analysis center can monitor the internal temperature of said container and initiate an alarm condition should the temperature rise excessively during the interim opening.

In the case of authorized final opening of the freight container, provision may in turn be made for an appropriate function code to be used, the reception of which is followed by the analysis center continuing to evaluate neither the event data from the first sensor or from the first group of sensors nor those from the second sensor or from the second group of sensors. In this case, all event data that the monitoring device still delivers to the analysis center following the authorized final opening are ignored.

When a plurality of freight containers are monitored, each freight container preferably has a dedicated associated monitoring device. Each monitoring device in this case has an explicitly assigned set of function codes in order to increase the security of the method according to the invention. The function codes assigned to the respective monitoring device from the set of function codes can be used only for authorizations for opening or closing operations for that freight container that has the associated monitoring device assigned to the set of function codes. For this reason, these function codes cannot be used to authorize opening or closing operations for other freight containers that have (the) other monitoring devices associated with them. In this case, it is conceivable for this to apply at any rate from the time at which that freight container whose monitoring device has been assigned a respective set of function codes has been closed for the first time.

Usually, provision is furthermore made for each function code to be able to be used only for authorizing a single opening operation or a single closing operation for the respective freight container, as a result of which, after a function code has been used for the first time, this function code cannot be used to authorize a further opening or closing operation. The function codes lose their validity following singular (successful) authorization.

According to a further embodiment of the invention, for authorized interim opening of the freight container it is possible to use a function code from a function group or of a function code type that is designed such that the analysis center, following reception of said function code, automatically rates a subsequent physical closing operation to follow for the freight container (usually closing of a freight container door) as having taken place with authorization.

Expediently, (time-based) validity periods are furthermore provided for function codes.

By way of example, provision may thus be made for an opening operation to be rated as having taken place with authorization only if the (physical) opening of the freight container (freight container door) takes place within a prescribed period after the relevant function code for authorizing this opening operation has been received by the analysis center.

In this way, a function code that has been used for authorized opening of this kind in which the physical opening operation has taken place outside the prescribed period loses its validity, which means that it cannot be used again for authorizing an opening operation.

After the validity of a function code has lapsed, this particular function code can no longer be used for later authorizations. By way of example, an alarm condition would be initiated in the analysis center should an attempt be made to authorize a later physical opening operation using such an invalid function code.

At least in theory, it is also conceivable for the function codes for authorized closing of the freight container to be provided with such a validity period.

BRIEF DESCRIPTION OF THE DRAWING

Further features of the invention become evident from the appended patent claims, the description below of a preferred exemplary embodiment, and the appended drawing, in which:

FIG. 1 shows a schematic block diagram of an inventive system for monitoring the integrity of a freight container that is operated on the basis of the inventive method.

DETAILED DESCRIPTION OF PREFERRED EMBODIMENTS

An important part of the inventive system for monitoring freight containers shown in FIG. 1 is firstly a monitoring device 10.

This monitoring device 10 has one or more sensors 12 that can be used to monitor a freight container, in the present example a sea, land and/or standard container, usually made of steel.

When the integrity of the container is violated, the monitoring device 10 delivers event data that represent this violation. In this case, an integrity violation comprises particularly the opening and/or the closing of one or more loading or access doors to the container, specifically regardless of whether or not this opening/closing takes place in a sanctioned or authorized manner.

The sensor(s) 12 is/are in operational communication with a control unit 11 of the monitoring device 10. The communication between control unit 11 and sensor 12 can take place by wire, but also wirelessly by radio or the like.

The monitoring device 10 is preferably positioned together with the sensor 12 inside the container to be monitored and is mounted there by means of suitable measures.

The inventive system is usually used to monitor not just one container but rather a multiplicity of containers. In this case, the respective containers of the system are each allocated monitoring devices 10 of the same type. The respective monitoring devices 10 are allocated to the respective transport containers usually at the beginning of transport.

Normally, transport of a transport container from a loading location or starting location to a destination is organized by a logistics company. If need be, this logistics company charges an external shipper with the actual loading of the container and the actual transport thereof.

The shipper equips the respective transport container provided for transport with the monitoring device 10. The monitoring device 10 is then switched on by operating an appropriate on/off switch. In order to assure all functions of the monitoring device 10, said monitoring device has a suitable, autonomous power supply, for example by means of appropriate batteries or storage batteries.

From the switch-on operation onward, the monitoring device 10 begins or the sensor(s) 12 therein begin(s) to monitor the container.

Usually, at least one of the sensors 12 is in the form of a door sensor monitoring the status of the door (open or closed) of the transport container. Furthermore, one of the sensors 12 may be a motion sensor that monitors movements within the container and/or movements by the container itself. In addition, it is conceivable to use detectors that are able to detect explosives or harmful radiation, in particular radioactive radiation. In this case, the sensor(s) 12 produce(s) suitable data from the switch-on operation for the monitoring device 10 onward.

In addition, it is possible to use sensors that are not primarily used for sensing an integrity violation based on manipulations, such as temperature sensors. Particularly in the case of cooling containers, that is to say transport containers with a cooling device, which are used to transport perishable goods (foodstuffs, drugs, etc.), for example, monitoring of the internal temperature of the container is important.

Each monitoring device 10 of the inventive system is connected or can be connected to an analysis center 14 by suitable wireless data transmission techniques, preferably communication techniques involving satellites (radio). To this end, the monitoring devices and the analysis center 14 each have suitable communication modules 15, namely transmission and/or reception modules, in particular on a radio basis. Suitable transmission and/or reception modules for this, including the antenna engineering that is necessary therefor, are known in the prior art and are not explained in more detail here.

Preferably subsequent to the installation of a monitoring device 10 in the respective transport container as already described previously, said transport container is loaded for the first time with the freight that is to be conveyed. In principle, the loading can naturally also take place before the monitoring device 10 is installed.

In order to be able to comply with security requirements, the invention ensures that the loading and closing of the container is demonstrably performed by a person who is sanctioned to do so.

For this purpose, the system provides for the use of electronic authorization codes. The authorization codes can be used to authorize violations of the integrity of the container. In particular, opening and/or closing of a container access door can be identified as sanctioned in this way.

In the present embodiment, the authorization codes comprise, in particular digital, certificates that can be used to check the identity of the sanctioned person transmitting the respective authorization code. In addition, the authorization codes comprise data that explicitly identify the respective monitoring device 10 and/or the respective container for which authorization codes are respectively used.

In addition, the authorization codes comprise data that allocate a respective particular function to them or that mark them as being affiliated to a particular function group. This will be explained in more detail later.

In this case, the authorization codes have previously been generated by appropriate computer devices in the analysis center 14 and transmitted to the sanctioned person by the analysis center 14. In this case, the transmission can take place via appropriately secured, electronic data transport routes, for example.

To increase security, provision may be made in this case for the authorization codes to be transmitted to the sanctioned person only after the container has been closed for the first time at the loading or starting location of the container.

In one variant of the invention, the electronic authorization codes are transmitted from the analysis center 14 to an authorization device 16 in the form of a handheld appliance, for example in the form of a portable electronic device, directly by data communications. By way of example, it is conceivable for the sanctioned person to download the authorization codes onto the authorization device 16 from an appropriate server at the analysis center 14 via a secured wireless Internet connection. The authorization device 16 or a memory associated with the authorization device 16 is then used to store the authorization codes.

After the container has been loaded for the first time, the person sanctioned to do so closes the door of said container. This closing operation results in a signal from the door sensor 12 of the monitoring device 10. This is because in the installed and the switched-on state of the monitoring device 10, any integrity violation, that is to say in this case any closing and any opening of the access door to the container, results in such a door sensor signal. The signal produced or corresponding event data that represent this signal is/are immediately then automatically transmitted to the analysis center 14 by means of the communication modules 15 using wireless data communications. The transmission of the event data is accordingly initiated or triggered by the sensing of the opening of the door by the door sensor 12.

The sanctioned person can authorize the closing operation in order to prevent the closing signal from setting off an alarm in the analysis center 14.

To this end, the sanctioned person can use the authorization device 16 to initiate the transmission of one of the codes, previously transmitted to the authorization device 16 and suitable for the authorization, to the analysis center 14. To this end, the sanctioned person positions himself in front of the container with the authorization device 16 in his hand. Operation of suitable control elements on the authorization device 16 initiates transmission of one of the codes, specifically by wireless short-range data transmission initially from the authorization device 16 to the monitoring device 10. For this purpose, the authorization device 16 and the monitoring device 10 have communication modules that are suitable for short-range data transmission.

The transmission device 10 then forwards the code that has been transmitted thereto to the analysis center 14 using the communication modules 15. The transmitted authorization codes are subsequently stored in one of the memories associated with the analysis center 14.

An analysis device 18 associated with the analysis center 14 rates the transmitted closing signal in respect of whether the closing operation took place in an authorized or unauthorized manner. For this purpose, the analysis device 18 may be a control device of suitable design and/or a computer device designed to have suitable software, for example. It checks whether a suitable authorization code has arrived in the memory associated with the analysis center 14 at the same time as the arrival of the event data that represent the closing of the door or in a stipulated period beforehand (a stipulated period afterward is theoretically also conceivable), respectively. For this, the analysis device 18 accesses the memory associated with the analysis center 14 and hence also with itself.

Furthermore, the analysis device 18 uses suitable algorithms to check particularly the validity and/or authenticity of the respectively transmitted authorization code. It compares the transmitted authorization code with authorization code parameters stored in a or the memory associated with the analysis device 18 or with the analysis center 14. In this case, these authorization code parameters need to match the transmitted authorization code or be in suitable relationships therewith in order for said authorization code to be rated as valid or authentic. Preferably, the authorization code parameters are stored in a database installed in the memory.

If, accordingly, the person sanctioned for the closing operation sends a suitable authorization code to the analysis center 14 in the manner described above at a time in immediate and stipulated proximity to the closing of the container door, the closing of the door is rated by the analysis device as having taken place with authorization.

Accordingly, no alarm message is then produced in the analysis center.

However, a somewhat different situation applies if persons without a sanction should violate the integrity of the container in an unsanctioned manner during the transport route by entering the interior of the container, for example via the door.

In this case, the door sensor 12 first of all produces appropriate event data again, i.e. data that represent the integrity violation, in this case the opening of the door.

These event data are also automatically transmitted to the analysis center 14. In the present case of unsanctioned opening of the container, however, a suitable authorization code is naturally not transmitted to the analysis center 14. The memory associated with the analysis center 14 accordingly does not store an authorization code suitable for authorizing the opening operation.

Consequently, the subsequent rating of the event data that represent the opening signal delivers the result that the opening must have taken place without authorization. The corresponding rating is again carried out by the analysis device 18, which for this purpose again reads the memory associated with the analysis center 14 in the manner already described. In so doing, it establishes that said memory does not store a suitable authorization code.

As a reaction to the rating of the opening as unauthorized, suitable measures can be initiated. By way of example, a signal generator can be used to produce an alarm signal that represents an alarm condition.

By way of example, this alarm signal can be observed immediately in the analysis center 14 by a relevant person, who subsequently initiates suitable measures. Said person can notify a security authority, for example, which examines the relevant container. The alarm signal can also be routed to various other private or official entities.

The alarm signals may be of widely different type, for example audible, visual, electrical or electronic signals. In the simplest case, the analysis device 18 associated with the analysis center 14 can initiate the sending of an appropriate e-mail or an SMS to a private or official entity.

Particularly insofar as the monitoring device 10 has a suitable locating or position-finding module, for example a GPS module, the precise site of the relevant container can furthermore be located without any problems.

In another scenario covered by the invention, the container is opened, unlike in the case described above, with authorization. Besides final opening at the destination of the container, this may also make sense when the container needs to be loaded with further freight in the interim on the transport route before the actual final destination is reached.

According to the invention, a person who is sanctioned for the interim loading or for interim opening can open the container without immediately setting off an alarm. The opening operation for the container is admittedly again sensed by the relevant sensor 12 of the monitoring device 10 in the manner described above and relevant event data representing this opening operation are subsequently sent to the analysis center 14. However, when the sanctioned person sends a suitable authorization code to the analysis center 14 within the stipulated time limits in a similar manner to the case of the closing operation described further above, the opening of the container is in this case rated by the analysis center as having taken place with authorization.

The monitoring device 10 remains active during the interim loading of the container. The container therefore continues to be monitored. The monitoring device 10 continues to send event data to the analysis center 14. If one of the sensors 12 is in the form of a motion sensor or in the form of a temperature sensor, for example, it continually sends data relating to movements within the container or relating to the container internal temperature to the analysis center 14 even after the container has been opened with authorization.

As soon as the loading for this interim loading operation has concluded, the sanctioned person can use a further authorization code to close the container again with authorization.

Hence, overall, continuous monitoring of the container is made possible from first authorized closing of the entire transport route, including possible interim opening operations or interim loading operations, up until the destination is reached.

As a particularly essential aspect of the invention, provision is made for the authorization codes to be in the form of function codes. As already described above, function codes denote such authorization codes as each have a particular associated function. In this case, function codes carry an identifier that identifies their association or their group affiliation. This is information or data that allow(s) the group affiliation of the respective function code to be detected.

Besides their property of being used to authorize the respective opening or closing operation for the freight container, these can be used to determine particular states or the respective status of the container. Depending on the type of the respective opening or closing operation that the sanctioned person performs, the sanctioned person accordingly uses function codes from different function code groups in order to authorize the respective operation. The analysis of the transmitted function codes in the analysis center 14, particularly using the analysis device 18, makes it possible, after the respective group affiliation has been established, to infer the state and/or the location of the container.

It is thus possible for the sanctioned person to use a function code from the group "container interim opening" for authorizing the aforementioned interim opening of the container.

For authorizing opening at the destination of the container, namely final opening of said container, it is possible to use a function code from the group "container final opening".

For authorizing closing at the starting location of the container, it is possible to use a function code from the group "first-time closing".

For authorizing closing after interim opening of a container, it is possible to use a function code from the group "closing after interim opening".

In a further refinement of this concept, it is conceivable, by way of example, for a plurality of types of interim opening operations to be permitted, with each individual interim opening operation being prompted by means of a function code from a respectively different function group.

Depending on what type of function code the sanctioned person sends to the analysis center 14, the analysis center 14 can accordingly infer what type of opening or what type of closing of the container is involved.

The physical opening of the door thereto is, as described above, transmitted in the analysis center in such a case by transmitting the event data from the door sensor 12. The information beyond that, regarding what type of opening or what type of closing is involved, is ascertained in the analysis center 14 from the type of function code transmitted by the sanctioned person.

In addition, the distinction of the various types of function codes allows the current site of the container to be easily determined in the analysis center 14. Before the container is sent, not only the starting or initial location but usually also the destination and possibly further locations between the starting location and destination, at which interim loading operations or interim opening operations for the container are meant to take place, have been arranged. Following transmission of the function codes in accordance with their respective type to the analysis center 14, the latter can infer whether the authorization, provided by the sanctioned person, of the respective opening operation or, similarly, of the respective closing operation was provided at the starting location, at the destination or at one of the previously stipulated locations for interim opening operations.

In a further form of the invention, function codes for authorizations for interim opening operations may be provided, after the reception of which the analysis center 14 or the analysis device 18 admittedly, as already described further above, subsequently ignores the event data that the door sensor 12 subsequently sends, as a result of which subsequent door opening operations or door closing operations (apart from authorized closing) do not result in an alarm signal in the analysis center 14. Signals from other sensors, such as from the temperature sensor, can continue to be rated or evaluated, however.

Thus, an alarm would be set off in the analysis center 14 if the event data delivered by the temperature sensor, already described above, for measurements of the container interior temperature indicate an excessive temperature inside the container. This scenario is particularly relevant to cooling containers.

By contrast, the signals from the door sensor 12 would also be monitored or evaluated by the analysis center 14 again only when the closing of the door is accompanied by the relevant authorization for the closing operation using a suitable function code "closing after interim opening".

A further important option for handling interim opening operations is to use, for authorizing an interim opening operation, a function code that results in the analysis center 14 automatically rating the next physical closing operation for the door that comes after the authorized interim opening operation for the door as authorized without the sanctioned person having to send a separate function code to authorize this closing. In other words, the next sensor signal that the door sensor 12 delivers when the door is closed ultimately results in the associated closing operation being authorized in the analysis center 14.

For logical reasons, the validity period of function codes that are used, particularly of such function codes for interim opening of a container, is otherwise subject to a time limit, for example of 15 or 20 min.

By way of example, a person who is sanctioned to authorize interim opening first of all sends the suitable function code to the analysis center 14. However, should said person fail to physically perform the associated door opening operation in the subsequent time in which the function code is valid, this would be detected in the analysis center 14. The validity of the function code subsequently lapses. This function code then cannot be used further. In other words, this function code would no longer be able to be used to authorize a subsequent door opening operation. If it were nevertheless used for subsequent authorization of door opening, the analysis center 14 would detect the invalidity of the function code or would not recognize the function code as valid. In this case, the associated physical opening operation would set off an alarm signal in the analysis center 14.

In general terms, the analysis center 14 accordingly monitors whether, after a function code is received within a predetermined period, the freight container door opening or closing operation associated with the function code or allocated thereto actually takes place.

According to a further embodiment, that can also be claimed separately, of the present invention, function codes from the function group "authorized parking" are provided.

After such a function code that has been transmitted to the analysis center 14 by a sanctioned person has been received, the analysis center 14 records the current location or the current position of the container, which has been transmitted to the analysis center 14 by an appropriate module, connected to the monitoring device 10, of a suitable position-finding system (for example GPS), as a target position. Over the further course of events, the current actual position is transmitted onward by the module of the monitoring device 10 to the analysis center 14 continuously or at particular intervals of time. Should the container be moved following reception of the function code, as a result of which the actual position which is then reported to the analysis center 14 differs from the target position in a predetermined manner, a signal, particularly an alarm signal, would be initiated in the analysis center.

Provision may thus be made for the container to be permitted to be moved relative to the target position either not at all or only within predetermined limits after reception of the function code "authorized parking". In other words, provision may be made for the actual position not to be permitted to differ from the target position, or to be permitted to differ only to a predetermined extent.

After a further function code "authorized parking terminated" transmitted by a sanctioned person has been received, the described monitoring of the position of the container would be terminated.

As a person skilled in the prior art will realize, there are naturally various inventive alternatives to the exemplary embodiments described above. As a person skilled in the art will realize in particular, various options exist for developing the individual components of the system and/or for combining them with one another using suitable data interfaces in order to carry out the inventive method.

LIST OF REFERENCE SYMBOLS

10 Monitoring device
11 Control unit
12 Sensor
14 Analysis center
15 Communication module
16 Authorization unit
18 Computer device
20 Database

The invention claimed is:

1. A method for monitoring the integrity of one or more freight containers along a transport route, wherein at least one freight container has a monitoring device (10) associated therewith that has at least one monitoring sensor (12) monitoring the integrity of the freight container, comprising:

sensing of an event violating the freight container integrity by the monitoring sensor (12);

transmitting event data, representing the integrity violation, to an analysis device (18) associated with an analysis center (14), wherein the analysis device (18) associated with the analysis center (14) rates the transmitted event data using predetermined criteria in respect of either a sanctioned or authorized or an unsanctioned or unauthorized integrity violation of the freight container, and wherein opening or closing of the freight container is rated as a sanctioned or authorized integrity violation if an electronic authorization code representing the sanction for the opening operation or the closing operation is sent to the analysis center (14) for the event data representing this integrity violation; and distinguishing different types of opening operations and/or different types of closing operations by using respective authorization function codes from different function groups, as result of which the analysis center (14) uses the type of the respectively received function code to determine what type of opening operation and/or what type of closing operation has taken place or is meant to take place.

2. The method as claimed in claim 1, further comprising at least one of:

authorizing a first-time closing operation for a freight container at the beginning of transport using a different type of function code than for authorizing a later further closing operation; and authorizing a first-time interim opening of the freight container prior to the conclusion of transport using a different type of function code than for authorizing a later, further authorized opening operation, such as a final opening upon the conclusion of the transport.

3. The method as claimed in claim 1 or 2, wherein the function codes of the same type or from the same function group have a shared identification that the analysis center (14) uses to distinguish function codes of different function code types in respect of the function group affiliation thereof.

4. The method as claimed in claim 2, wherein the analysis center (14) does not continue to rate transmitted event data from a first sensor or from a first group of sensors of the monitoring device (10), such as from at least one door sensor that monitors the closed versus open state of the door of the freight container, after the analysis center (14) has received a function code for authorized interim opening and also the event data associated with the relevant interim opening operation for the freight container, but in that the analysis center (14) continues to rate event data from a second sensor or from a second group of sensors of the monitoring device (10), such as from at least one sensor for measuring the temperature inside the freight container.

5. The method as claimed in claim 4, wherein the analysis center (14) continues to evaluate neither event data from the first sensor or from the first group of sensors nor those from the second sensor or from the second group of sensors as soon as it has received a function code for authorized final opening of the freight container or as soon as it has received both this function code and the event data associated with the relevant final opening operation for the freight container.

6. The method as claimed in claim 2, further comprising, for authorized interim opening of the freight container, using a function code from a function group, which function code is designed such that the analysis center (14), after having received said function code, rates the next closing operation that follows for the freight container as having taken place with authorization.

7. The method as claimed in claim 1 or 2, wherein the function codes for authorized opening and/or closing of the freight container, such as for authorized interim opening, are in a form such that the associated physical opening or closing operation for the freight container is rated as having taken place with authorization only if the associated opening or the associated closing takes place within a prescribed period of time after the function code has been received by the analysis center.

8. The method as claimed in claim 7, wherein a function code that has been used for authorized opening and/or closing for which the physical opening or closing operation has taken place outside the prescribed period of time loses its validity, as a result of which it cannot be used again for authorizing an opening or closing operation.

9. The method as claimed in claim 1 or 2, wherein each function code can be used only for authorizing a single opening operation or a single closing operation for the freight container, as a result of which, after a function code has been used for the first time, this function code cannot be used to authorize a further opening or closing operation.

10. The method as claimed in claim 1 or 2, wherein when a plurality of freight containers are monitored, each freight container has a dedicated associated monitoring device (10), wherein each monitoring device (10) has an explicitly assigned set of function codes, and wherein, after the freight container associated with the respective monitoring device (10) has been closed for the first time, the function codes assigned to the respective monitoring device (10) from the set of function codes can be used only for authorizations for opening or closing operations for that freight container that has the associated monitoring device (10) assigned to the set of function codes, as a result of which these function codes cannot be used to authorize opening or closing operations for other freight containers with other monitoring devices (10).

11. The method as claimed in claim 1, further comprising a computer device in the analysis center (14), which computer device has suitable computer software, computer memory, and computer algorithms for distinguishing the different types of opening operations and/or different types of closing operations by using the respective authorization function codes from different function groups, as result of which the analysis center (14) uses the type of the respectively received function code to determine what type of opening operation and/or what type of closing operation has taken place or is meant to take place.

12. A system for monitoring the integrity of one or more freight containers along a transport route, such as for carrying out the method as claimed in claim 1 or 2, wherein comprising at least one freight container having a monitoring device (10) associated therewith that has at least one monitoring sensor (12) monitoring the integrity of the freight container, wherein the sensing of an event violating the freight container integrity by the monitoring sensor (12) is followed by event data, representing the integrity violation, being transmitted to a remote analysis device (18) associated with an analysis center (14), wherein the analysis center (14) using the associated analysis device (18) rates the transmitted event data using predetermined criteria in respect of either a sanctioned or authorized or an unsanctioned or unauthorized integrity violation of the freight container, wherein opening or closing of the freight container is rated as a sanctioned or authorized integrity violation if an electronic authorization code representing the sanction for the opening operation or the closing operation is available to the analysis center (14) for the event data representing this integrity violation, and wherein different types of opening operations and/or different types of closing operations are distinguished by using respective authorization function codes from different function groups, as result of which the analysis center (14) uses the type of respectively received function code to determine what type of opening operation and/or what type of closing operation has taken place or is meant to take place.

13. The system as claimed in claim 12, further comprising a computer device in the analysis center (14), which computer device has suitable computer software, computer memory, and computer algorithms for distinguishing the different types of opening operations and/or different types of closing operations by using the respective authorization function codes from different function groups, as result of which the analysis center (14) uses the type of the respectively received function code to determine what type of opening operation and/or what type of closing operation has taken place or is meant to take place.

* * * * *

UNITED STATES PATENT AND TRADEMARK OFFICE
CERTIFICATE OF CORRECTION

PATENT NO. : 9,828,174 B2
APPLICATION NO. : 14/123425
DATED : November 28, 2017
INVENTOR(S) : Wolfgang Busch and Klaus Hornbostel It is certified that error appears in the above-identified patent and that said Letters Patent is hereby corrected as shown below:

On the Title Page

The (73) Assignee information "Airbus Defence and Space GmbH, Taufkirhchen (DE)" should read --Airbus Defence and Space GmbH, Taufkirchen (DE)--.

Signed and Sealed this
Tenth Day of April, 2018

Andrei Iancu
*Director of the United States Patent and Trademark Office*